(12) United States Patent
Wen

(10) Patent No.: US 8,433,189 B2
(45) Date of Patent: Apr. 30, 2013

(54) LINEAR PROTECTION METHOD OF THE OPTICAL NETWORK

(75) Inventor: Jianzhong Wen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 297 days.

(21) Appl. No.: 12/742,249

(22) PCT Filed: Dec. 27, 2007

(86) PCT No.: PCT/CN2007/003837
§ 371 (c)(1),
(2), (4) Date: May 10, 2010

(87) PCT Pub. No.: WO2009/062350
PCT Pub. Date: May 22, 2009

(65) Prior Publication Data
US 2010/0254701 A1    Oct. 7, 2010

(30) Foreign Application Priority Data
Nov. 15, 2007 (CN) .......................... 2007 1 0124710

(51) Int. Cl.
*H04B 10/08* (2006.01)
(52) U.S. Cl.
USPC ................................................. 398/2; 398/5

(58) Field of Classification Search .................... 398/1–5
See application file for complete search history.

(56) References Cited

U.S. PATENT DOCUMENTS

| | | | |
|---|---|---|---|
| 2003/0170020 A1* | 9/2003 | Chaudhuri et al. | 398/5 |
| 2009/0034975 A1* | 2/2009 | Sadananda | 398/79 |

FOREIGN PATENT DOCUMENTS

| | | |
|---|---|---|
| CN | 1753324 A | 3/2006 |
| EP | 1009191 A2 | 6/2000 |
| JP | 2006033319 A | 2/2006 |

* cited by examiner

*Primary Examiner* — Leslie Pascal
(74) *Attorney, Agent, or Firm* — McClure, Qualey & Rodack, LLP

(57) ABSTRACT

The present invention discloses a linear protection method for an optical network, used for protecting a failed service path in the optical network, and the method comprises: setting priorities of services carried on service paths participating in linear protection of the optical network as service priorities; selecting, from the service paths participating in the linear protection, a service path of which the service priority is lower than that of the failed service path as a protection path, and bridge switching the service on the failed service path to the protection path. The present invention implements protection of service paths according to the priority of the service carried on the failed service path, and enhances the security of service paths.

8 Claims, 4 Drawing Sheets

LINEAR PROTECTION METHOD OF THE OPTICAL NETWORK

CROSS REFERENCE RELATED APPLICATIONS

This application is a national phase of PCT/CN2007/003837 filed Dec. 27, 2007, which claims priority to China Application Serial No. 200710124710.5, filed Nov. 15, 2007, both of which are entirely incorporated herein by reference.

TECHNICAL FIELD

The present invention relates to the field of service path protection in an optical network, and in particular, to a linear protection method for an optical network.

BACKGROUND OF THE INVENTION

Currently, standards relevant with SDH (Synchronous Digital Hierarchy) and OTN (Optical Transmission Net) all define the 1:N linear protection mechanism, and standards relevant with OTN also refer to a M:N protection method for a communication network. However, the protection mechanisms in the prior art have the following drawbacks:

1. The numbers of working paths and protection paths are required to be fixedly configured. If the number of protection paths configured is less than that of the working paths, part of the working path services may not be protected when many working paths break down simultaneously.

2. When executing extra services, the protection paths do not differentiate the priority of the extra services, causing low security of the extra services.

The protection configuration manner in an optical network in the prior art is not sufficiently flexible, and the security of services should be further enhanced. Therefore, the prior art needs to be improved and developed.

SUMMARY OF THE INVENTION

The technical problem to be solved by the present invention is to provide a linear protection method for an optical network, so that a failed service path in an optical network can be flexibly protected according to the priority of its service.

In order to solve the above problem, the present invention provides a linear protection method for an optical network, used for protecting a failed service path in the optical network, the method comprising the following steps of:

A. setting priorities of services carried on service paths participating in linear protection of the optical network as service priorities; and B. selecting, from the service paths participating in the linear protection, a service path of which the service priority is lower than that of the failed service path as a protection path, and bridge switching the service on the failed service path to the protection path.

Furthermore, the method also comprises the following step before the step B:

configuring fixed priorities for the service paths participating in the linear protection of the optical network and setting the service priorities of the service paths to be equal to the fixed priorities.

Furthermore, the method also comprises:

setting a node where the failed service path is located in the optical network as a failure point, which selects the protection path for the failed service path in the step B.

Furthermore, the step B comprises:

selecting, from the service paths participating in the linear protection, a service path, of which the service priority is lower than that of the failed service path and meanwhile is the lowest, as the protection path, bridge switching the service on the failed service path to the protection path, and modifying the service priority of the protection path to be the service priority of the failed service path.

Furthermore, the method also comprises:

if the service path, of which the service priority is lower than that of the failed service path and meanwhile is the lowest, is already a protection path, then revoking existing service bridge switching on the protection path, and then bridge switching the service on the failed service path to the protection path.

Furthermore, the method also comprises:

if there are a plurality of service paths of which the service priorities are lower than that of the failed service path and meanwhile are the lowest, then selecting therefrom a service path which is a non-protection path as the protection path of the failed service path.

Furthermore, the method also comprises:

if there are a plurality of service paths of which the service priorities are lower than that of the failed service path and meanwhile are the lowest, but all of the plurality of service paths are already protection paths, then selecting therefrom a protection path with the lowest fixed priority as the protection path of the failed service path.

Furthermore, the step B further comprises a process of restoring the failed service path, which comprises the following steps of:

C1. revoking existing service bridge switching on the protection path corresponding to the failed service path, and restoring the service carried on the protection path; and C2. restoring a protection priority of the protection path corresponding to the failed service path to the service priority thereof.

Furthermore, the method also comprises the following step after the step C2:

the failure point detecting whether there are other failed service paths for which service bridge switching is not performed yet, if yes, finding out a service path with the highest service priority therefrom in order to protect the failed service path with the highest service priority.

Furthermore, the step B further comprises a process of protection path adjustment, which comprises the following steps of D1. selecting a protection path with the highest fixed priority;

D2. selecting a non-protection path with the lowest service priority;

D3. comparing the fixed priority of the protection path with the service priority of the non-protection path; if the former one is higher than the latter one, revoking the service bridge switching on the protection path with the highest fixed priority, restoring the service priority of the protection path with the highest fixed priority to the fixed priority thereof, and using the non-protection path with the lowest service priority as a new protection path; and D4. setting up the service bridge switching previously on the protection path with the highest fixed priority on the non-protection path with the lowest service priority, and modifying the service priority of the non-protection path with the lowest service priority to be the service priority of the protection path with the highest fixed priority.

Compared with the prior art, the present invention provides a linear protection method for an optical network, in which when a service path has a failure, a service path of which the service priority is lower than that of the failed service path is selected as a protection path, and the service on the failed service path is bridge switched to the selected protection path; thereby implementing protection of service paths according to the priority of the service carried on the failed service path, and enhancing the security of the service paths.

PREFERRED EMBODIMENTS OF THE INVENTION

Figure 1:
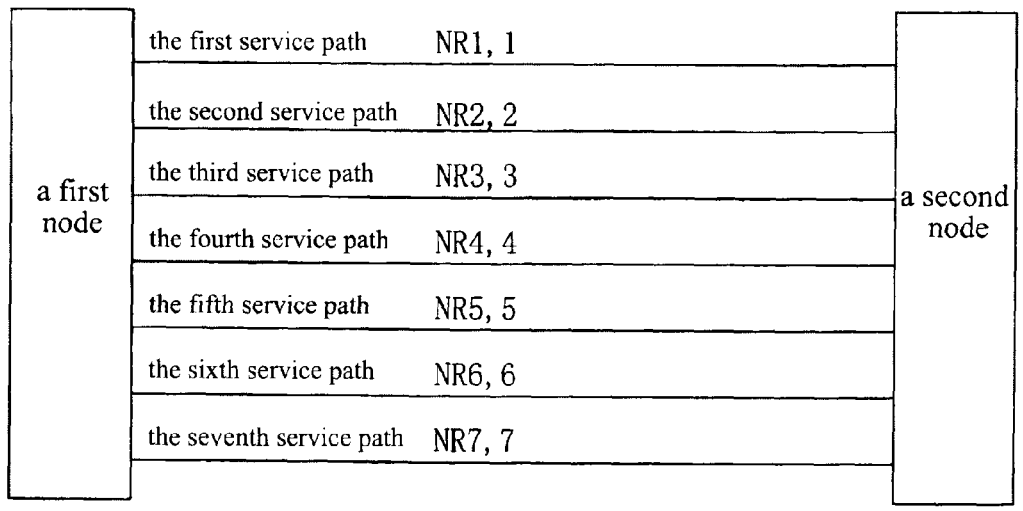
FIG. 1 shows an initial state when none of the seven service paths in a SDH network has a failure according to the present invention.

Preferred embodiments of the present invention will be further described in detail below with reference to the drawings.

In the linear protection method for an optical network provided by the present invention, a detected failure node on a service path is regarded as a failure point; the node of the other end corresponding to the failure point and located in the same linear protection of the optical network is regarded as a distal end of the failure point.

The present invention firstly assigns a fixed priority to each service path in the linear protection of the optical network, the priority of the service carried on the service path is service priority, and the fixed priority of the service path is set to be equal to the service priority before service bridge switching is performed between service paths. The protection of the failed service path in the present invention is carried out according to the service priorities of the service paths, instead of using the method of dividing the service paths into working paths and protection paths as used in the prior art, thereby increasing security and effectiveness of the linear protection of the optical network.

The process of selecting a protection path for a failed service path and bridge switching the service on the failed service path to the protection path according to the present invention comprises the following steps of:

101, the failure point seeking a service path having the lowest service priority from service paths with service priorities lower than that of the failed service path as a protection path; and if no service path satisfying such condition is found, proceeding to step 105;

If a service path satisfying the condition is found and the service path is not used as a protection path yet, then proceeding to step 103; wherein, if a plurality of service paths, of which the service priorities are lower than that of the failed service path and are also the lowest service priority, are found, then selecting one service path being a non-protection path therefrom as the protection path of the failed service path, and proceeding to step 103;

If a service path satisfying the condition is found, but the service path is already a protection path, then proceeding to step 102; wherein, if the found plurality of service paths, of which the service priorities are lower than that of the failed service path and are also the lowest service priority, are all protection paths already, then selecting a protection path having the lowest fixed priority therefrom as the protection path of the failed service path, and proceeding to step 102;

Wherein, apparently the protection path to be found is a service path that has no failure currently.

102, transmitting a protocol message in the protection path according to the service bridge switching flow of 1:N or M:N protection protocol in the prior art, the process of transmitting the protocol message being consistent with the 1:N linear protection protocol defined in the SDH or OTN standard, and by the transmission of the protocol message, conforming that the protection path can be used for protection of the failed service path, then revoking the existing service bridge switching on the protection path, afterwards, the failure point and the distal end of the failure point bridge switching the service on the failed service path to the protection path, then proceeding to step 104.

The service bridge switching flow according to the 1:N or M:N protection protocol in the prior art and the process of transmitting the protocol message in the present invention is consistent with the prior art, and will not be repeated here.

103, transmitting a protocol message in the protection path according to the protection switching flow of 1:N or M:N protection protocol in the prior art, confirming by the transmission of the protocol message that the protection path can be used for protection of the failed service path, and then the failure point and the distal end of the failure point bridge switching the service on the failed service path to the protection path.

104, modifying the service priority of the protection path to be the service priority of the failed service path at the failure point and the distal end of the failure point.

105, end.

According to a second preferred embodiment of the present invention, when the failed service path in the first preferred embodiment is restored, a process of restoring the service carried on the failed service path added by the present invention is as follows:

201, revoking the service bridge switching on the protection path according to the switching flow of 1:N or M:N protection protocol in the prior art, and restoring the service carried on the protection path.

202, restoring the service priority of the protection path to its fixed priority at the failure point and the distal end of the failure point by transmitting a protocol message in the protection path.

203, the failure point detecting whether there are other failed service paths for which service bridge switching is not performed yet, if yes, selecting the service path with the highest service priority therefrom, and carrying out protection of the failed service path with the highest service priority according to the steps described in the first embodiment.

204, end.

Utility of the service paths is increased in the second preferred embodiment of the present invention, thereby making the linear protection method for the optical network more effective.

After the protection action is carried out among the service paths of the optical network for many times, it is possible that the service path with a higher fixed priority is used for protection while the service path with a lower fixed priority works normally. According to a third preferred embodiment of the present invention, a process of protection path adjustment is added after the first preferred embodiment or the second preferred embodiment to adjust the non-protection path to a service path with a high fixed priority so that the service having a higher service priority on the service path with a higher fixed priority can be implemented in time.

301, seeking a service path having the highest fixed priority from all the protection paths, and if it is found, proceeding to step 302, otherwise, proceeding to step 307.

302, finding out a non-protection path having the lowest service priority from all the non-protection paths.

303, comparing the fixed priority of the protection path with the service priority of the non-protection path, if the former one is higher than the latter one, then proceeding to step 304, otherwise, proceeding to step 307.

304, revoking the service bridge switching on the protection path having the highest fixed priority according to the service bridge switching flow of 1:N or M:N protection protocol in the prior art, and modifying its service priority to be its fixed priority.

305, bridge switching the service on the protection path having the highest fixed priority to the non-protection path having the lowest service priority according to the service bridge switching flow of 1:N or M:N protection protocol in the prior art; and modifying the service priority of the non-protection path having the lowest service priority, the modified service priority being the service priority of the protection path having the highest fixed priority.

306, returning to step 301.

307, end.

The third embodiment may be executed automatically after the first embodiment or the second embodiment, or may be manually initiated for execution as desired.

The seven service paths between a first node and a second node in a SDH network serve as a linear protection group to implement the protection method of the present invention through the following steps:

The initial states of the seven service paths are all normal working state, a corresponding fixed priority is configured for each service path, the fixed priorities of the seven service paths decease progressively from one to seven according to the sequencing of the service paths, and the service priorities of the services carried on the seven service paths are equal to the fixed priorities when there is no service bridge switching among the seven service paths. In other words, the fixed priority of the first service path is one, and when there is no service bridge switching, the service priority of the service carried on the first service path is also one; the fixed priority of the second service path is two, and when there is no service bridge switching, the service priority of the service carried on the second service path is also two, and so forth, till the seventh service path, as shown in FIG. 1. In the seven service paths, default codes without request, i.e., the NRm,n protocol messages in the drawings, are sent through protocol bytes, wherein the NRm,n protocol message is a message defined in the SDH or OTN protection protocol.

Figure 2:
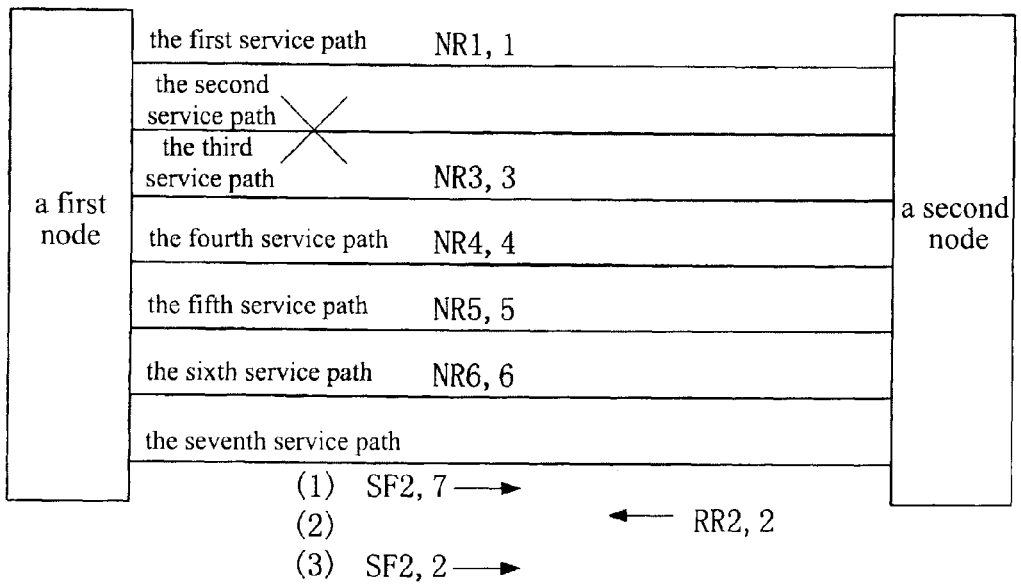
FIG. 2 shows a process of bridge switching the service on the second service path having a failure to the seventh service path among the seven service paths in the SDH network according to the present invention.

The first node detects a failure in the second service path, as shown in FIG. 2, in which the service path having a failure is indicated by a cross. In the present invention, in an optical network, the node where the seven service paths are located is noted as a first node, i.e., the failure point; the node of the other end in the optical network corresponding to the first node is noted as a second node, i.e., the distal end of the failure point. The present invention implements service bridge switching for the second service path having a failure so as to protect it according to the following steps of:

401, the first node seeking a protection path for the second service path from the service paths with service priorities lower than that of the second service path, wherein the protection path is the service path with the lowest service priority, i.e., the seventh service path.

402, the first node and the second node bridge switching the service on the second service path to the seventh service path based on negotiation through service bridge switching protocol messages, as shown in FIG. 2.

Both the SRm,n and the RRm,n in FIG. 2 are identical to their counterparts defined in the SDH or OTN protocol.

403, the first node and the second node modifying the service priority of the seventh service path to be the fixed priority of the second service path.

The service priority of the seventh service path used as the protection path can be comprehended as the identifier 2 of the message SF2,2 in FIG. 2. The service priority of the protection path in all the drawings of the embodiments of SDH network in the present invention can be comprehended in a similar way.

404, end.

Figure 3:
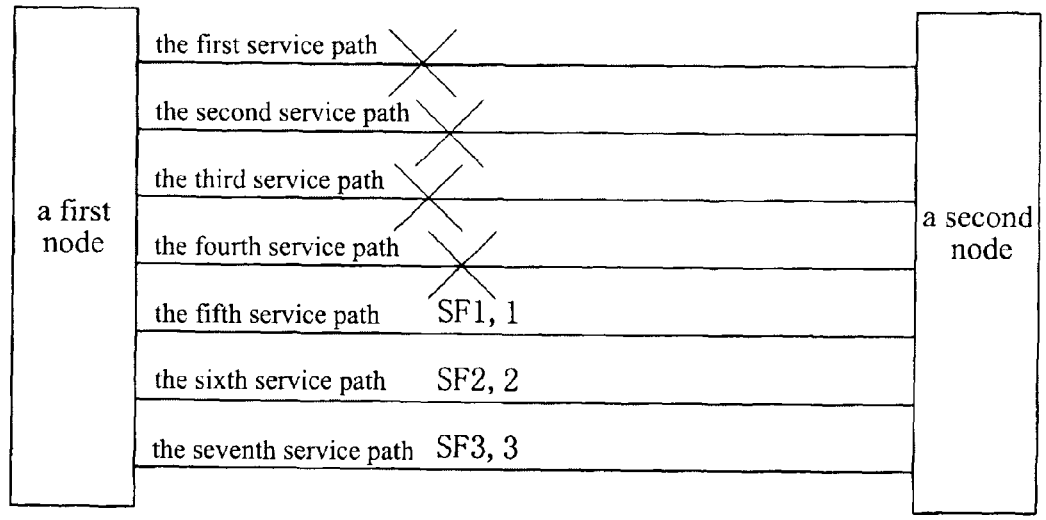
FIG. 3 shows an initial state before revoking service bridge switching among the seven service paths in the SDH network according to the present invention.

As shown in FIG. 3, when the first service path, the second service path, the third service path and the fourth service path in the SDH network each has a failure, and the fifth service path, the sixth service path and the seventh service path are used to protect the first service path, the second service path and the third service path respectively, if the first node detects the restoration of the second service path, then the service bridge switching should be revoked according to the following steps.

501, revoking the service bridge switching between the second service path and the sixth service path, and restoring the service carried on the sixth service path.

Figure 4:
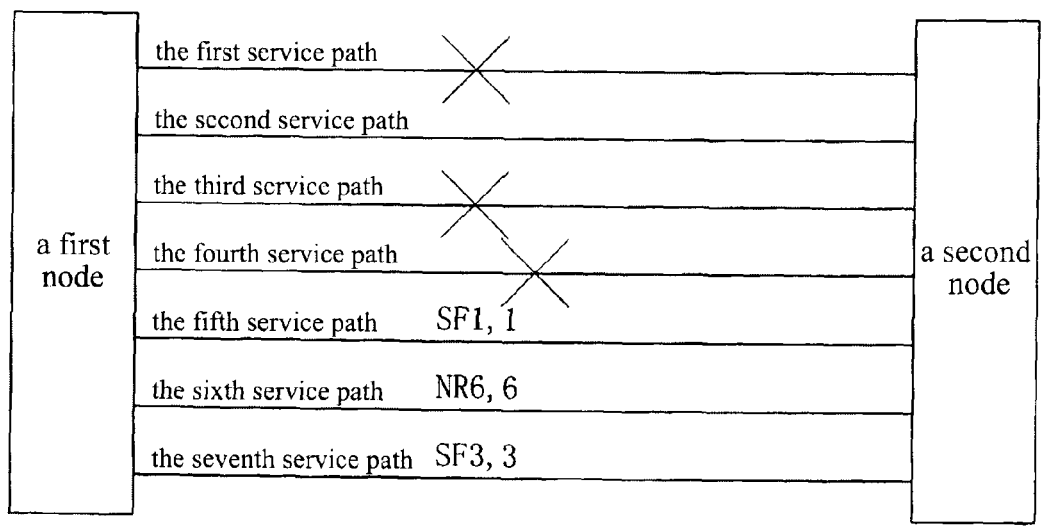
FIG. 4 shows the state after revoking the service bridge switching from the second service path to the sixth service path among the seven service paths in the SDH network according to the present invention.

502, the first node and the second node restoring the service priority of the sixth service path to its fixed priority, as shown in FIG. 4.

Figure 5:
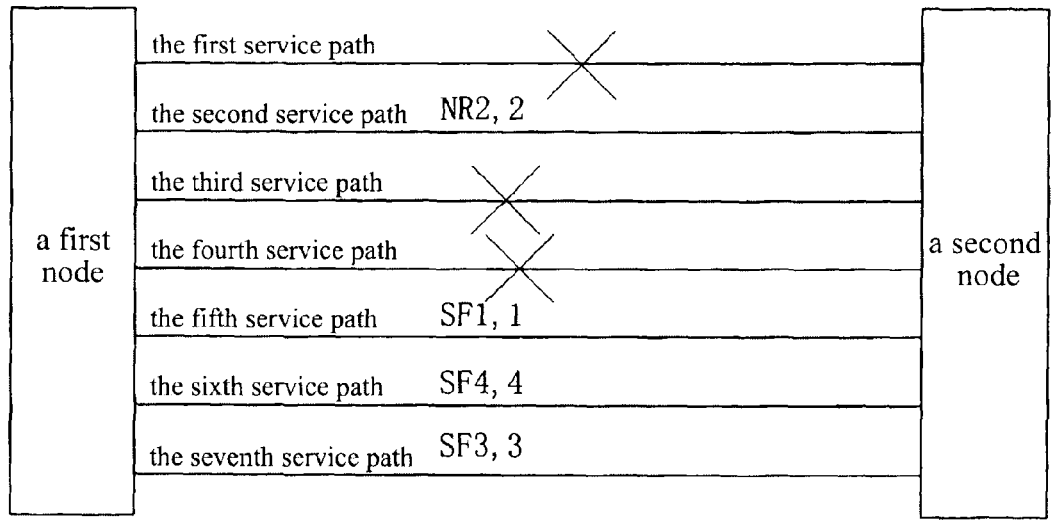
FIG. 5 shows the final state after revoking service bridge switching among the seven service paths in the SDH network according to the present invention.

503, the first node finding by checking that the fourth service path has a failure and no service bridge switching is performed for it yet, then bridge switching the service on the fourth service path to the sixth service path according to the steps 401 to 404, as shown in FIG. 5.

504, end.

Figure 6:
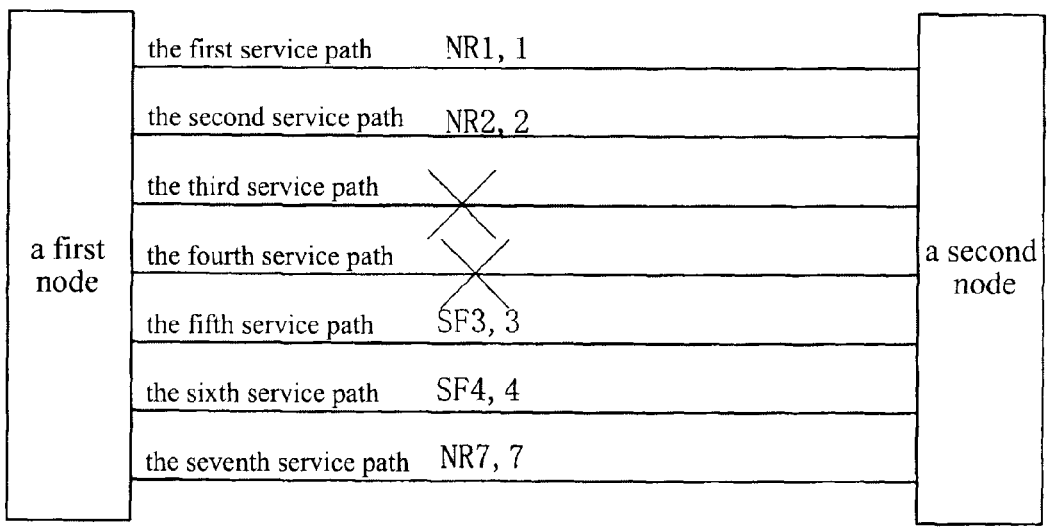
FIG. 6 shows an initial state before protection path adjustment among the seven service paths in the SDH network according to the present invention.

The initial state of the SDH network includes the service bridge switching from the first service path to the seventh service path, the service bridge switching from the fourth service path to the sixth service path, and the service bridge switching from the third service path to the fifth service path, and afterwards, the first service path is restored, accordingly only the service bridge switching from the fourth service path to the sixth service path and the service bridge switching from the third service path to the fifth service path remains. At this time, the fifth service path and the sixth service path are used for protection, and their priorities are both higher than that of the seventh service path which is working normally, as shown in FIG. 6. In such case, the fifth service path and the sixth service path are adjusted according to the following steps.

601, finding out a protection path with the highest fixed priority, i.e., finding the fifth service path which is the protection path with the highest fixed priority from the fifth service path and the sixth service path.

602, finding out a non-protection path with the lowest service priority, i.e., finding the seventh service path which is the non-protection path with the lowest service priority from all the non-protection paths.

603, the fixed priority of the fifth service path being higher than the service priority of the seventh service path.

Figure 7:
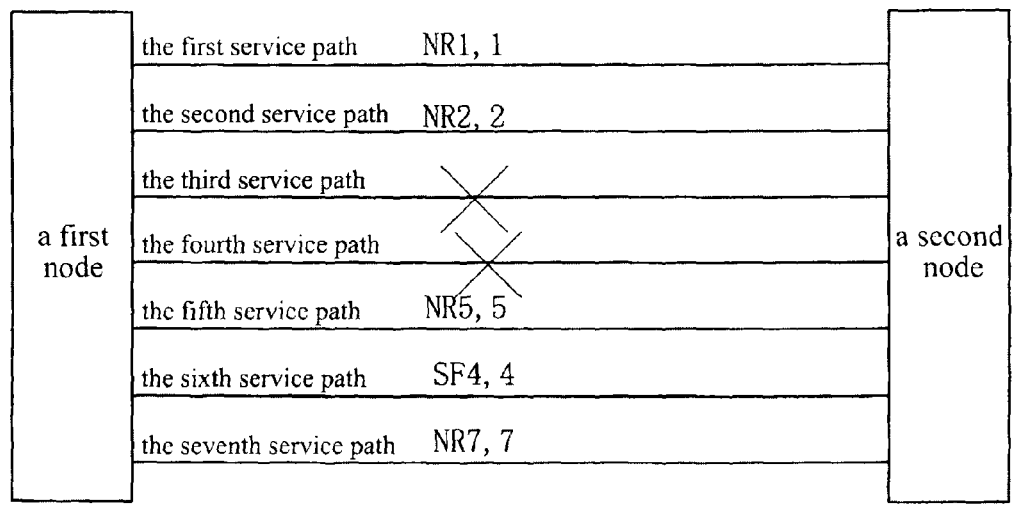
FIG. 7 shows the state after revoking the fifth service path to use as a protection path in protection path adjustment among the seven service paths in the SDH network according to the present invention.

604, as shown in FIG. 7, revoking the service bridge switching from the third service path to the fifth service path, and restoring the service priority of the fifth service path to its fixed priority.

Figure 8:
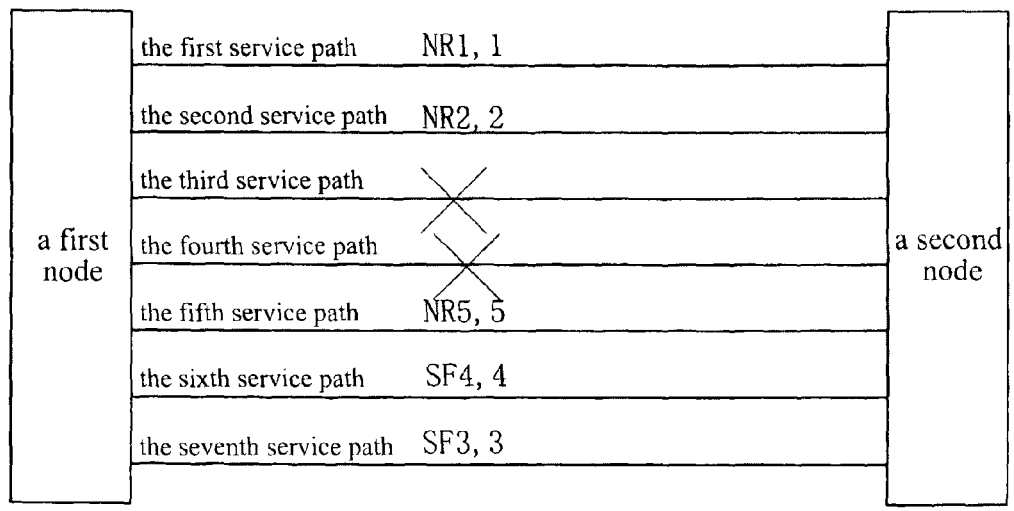
FIG. 8 shows the final state after protection path adjustment among the seven service paths in the SDH network according to the present invention.

605, bridge switching the service on the third service path to the seventh service path, and modifying the service priority of the seventh service path to be the service priority of the third service path, as shown in FIG. 8.

606, repeating step 601, and the sixth service path being the protection path with the highest fixed priority; repeating step 602, and the fifth service path being the non-protection path with the lowest service priority; then learning by comparison that the fixed priority of the sixth service path is not higher than the service priority of the fifth service path.

607, end.

The linear protection method for an optical network provided by the present invention is irrelevant with the level of a network to be linearly protected, and can be used for linear protection of SDH multiplex section layer, protection of SDH higher order path or lower order path layer, and linear protection of ODU path layer of OTN. The present invention utilizes overhead bytes in an optical network to transmit information: in regard to the linear protection of SDH multiplex section layer, K1, K2 bytes may be used to transmit protocol messages; in regard to the linear protection of SDH higher order path or lower order path layer, K3, K4 bytes may be used to transmit protocol messages; and in regard to the linear protection of ODU path layer of OTN, the APS byte of the ODU layer may be used to transmit protocol messages.

It shall be appreciated that the above detailed description of the preferred embodiments of the present invention should not be regarded as limitations to the protection scope of the present patent of invention, which is defined by the attached claims.

INDUSTRIAL APPLICABILITY

The present invention provides a linear protection method for an optical network, in which the services carried on a group of service paths that participate in the linear protection of the optical network are classified into different service priorities, and overhead bytes in the optical network are utilized to transmit information, so as to achieve the function of automatically seeking a service path having a low service priority when any one of the service paths has a failure, to protect the failed service path, thereby increasing the flexibility of configuring protection manners and the security of services in the optical network and enhancing the operability in application as well.

What I claim is:

1. A linear protection method for an optical network, used for protecting a failed service path in the optical network, the method comprising the following steps of:

A. setting a priority of service carried on each service paths participating in linear protection of the optical network as a service priority for each service path; and B. selecting, from service paths participating in the linear protection, a service path of which the service priority is lower than that of the failed service path as a protection path, and bridge switching the service on the failed service path to the protection path;

wherein the step B comprises:

selecting, from the service paths participating in the linear protection, a service path, of which the service priority is lower than that of the failed service path and meanwhile is the lowest, as the protection path, bridge switching the service on the failed service path to the protection path, and modifying the service priority of the protection path to be the service priority of the failed service path;

and the method further comprising:

if there are a plurality of service paths of which the service priorities are lower than that of the failed service path and meanwhile are the lowest, then selecting therefrom a service path which is a non-protection path as the protection path of the failed service path.

2. The protection method according to claim 1, further comprising the following step before the step B:

configuring a fixed priority for each service paths participating in the linear protection of the optical network and setting the service priority of each service path to be equal to the fixed priority.

3. The protection method according to claim 2, wherein the step B further comprises a process of restoring the protection path back to the service path after the failed service path is recovered, which comprises the following steps of:

C1. revoking existing service bridge switching on the protection path corresponding to the failed service path, and restoring the service carried on the protection path; and C2. restoring a protection priority of the protection path corresponding to the failed service path to the service priority thereof.

4. The protection method according to claim 3, further comprising the following step after the step C2:

the failure point detecting whether there are other failed service paths for which service bridge switching is not performed yet, if yes, finding out a service path with the highest service priority therefrom in order to protect the failed service path with the highest service priority.

5. The protection method according to claim 2, wherein the step B further comprises a process of protection path adjustment, which comprises the following steps of:

D1. selecting a protection path with the highest fixed priority;

D2. selecting a non-protection path with the lowest service priority;

D3. comparing the fixed priority of the protection path with the service priority of the non-protection path; if the former one is higher than the latter one, revoking the service bridge switching on the protection path with the highest fixed priority, restoring the service priority of the protection path with the highest fixed priority to the fixed priority thereof, and using the non-protection path with the lowest service priority as a new protection path; and D4. setting up the service bridge switching previously on the protection path with the highest fixed priority on the non-protection path with the lowest service priority, and modifying the service priority of the non-protection path with the lowest service priority to be the service priority of the protection path with the highest fixed priority.

6. The protection method according to claim 1, further comprising:
   setting a node where the failed service path is located in the optical network as a failure point, which selects the protection path for the failed service path in the step B.

7. The protection method according to claim 1, further comprising:
   if the service path, of which the service priority is lower than that of the failed service path and meanwhile is the lowest, is already a protection path, then revoking existing service bridge switching on the protection path, and then bridge switching the service on the failed service path to the protection path.

8. The protection method according to claim 7, further comprising:
   if there are a plurality of service paths of which the service priorities are lower than that of the failed service path and meanwhile are the lowest, but all of the plurality of service paths are already protection paths, then selecting therefrom a protection path with the lowest fixed priority as the protection path of the failed service path.

\* \* \* \* \*